(12) United States Patent
Mathon et al.

(10) Patent No.: US 9,919,457 B2
(45) Date of Patent: Mar. 20, 2018

(54) METHOD FOR PRODUCING PREFORMS

(71) Applicant: SNECMA, Paris (FR)

(72) Inventors: Richard Mathon, Brunoy (FR); Dominique Magnaudeix, Moissy-Cramayel (FR); Noemie Souhaite, Moissy-Cramayel (FR); Yann Marchal, Moissy-Cramayel (FR); Matthieu Gimat, Portsmouth, NH (US)

(73) Assignee: SNECMA, Paris (FR)

( * ) Notice: Subject to any disclaimer, the term of this patent is extended or adjusted under 35 U.S.C. 154(b) by 427 days.

(21) Appl. No.: 14/424,612

(22) PCT Filed: Aug. 14, 2013

(86) PCT No.: PCT/FR2013/051942
§ 371 (c)(1),
(2) Date: Feb. 27, 2015

(87) PCT Pub. No.: WO2014/033390
PCT Pub. Date: Mar. 6, 2014

(65) Prior Publication Data
US 2015/0224684 A1     Aug. 13, 2015

(30) Foreign Application Priority Data
Aug. 28, 2012  (FR) ...................... 12 58041

(51) Int. Cl.
| | | |
|---|---|---|
| B29C 43/14 | (2006.01) | |
| B29B 11/16 | (2006.01) | |
| B29C 43/40 | (2006.01) | |
| B29C 70/46 | (2006.01) | |
| B29C 70/22 | (2006.01) | |
| B29K 307/04 | (2006.01) | |
| B29C 43/36 | (2006.01) | |
| B29L 31/00 | (2006.01) | |

(52) U.S. Cl.
CPC ............. *B29C 43/14* (2013.01); *B29B 11/16* (2013.01); *B29C 43/40* (2013.01); *B29C 70/222* (2013.01); *B29C 70/462* (2013.01); *B29C 2043/3665* (2013.01); *B29K 2307/04* (2013.01); *B29L 2031/00* (2013.01)

(58) Field of Classification Search
CPC .. B29C 43/14; B29C 43/40; B29C 2043/3665
See application file for complete search history.

(56) References Cited

U.S. PATENT DOCUMENTS

| | | | | |
|---|---|---|---|---|
| 5,343,619 A * | 9/1994 | Lardellier | ............... | F01D 5/147 29/889.7 |
| 5,407,616 A * | 4/1995 | Dube | ..................... | B29C 70/50 264/136 |
| 5,568,780 A * | 10/1996 | Menzin | ................... | D05B 23/00 112/470.18 |
| 5,826,332 A * | 10/1998 | Bichon | ................ | B21D 26/055 228/118 |
| 7,354,538 B2 * | 4/2008 | Semersky | ............... | B29C 49/78 264/40.1 |
| 7,927,528 B2 * | 4/2011 | Owens | ................... | B29B 15/122 264/134 |
| 9,587,492 B2 * | 3/2017 | Roberts, III | ............... | F01D 5/18 |
| 2004/0009258 A1 * | 1/2004 | Romanski | ........... | B29C 45/4225 425/533 |
| 2006/0231981 A1 | 10/2006 | Lee et al. | | |
| 2009/0050263 A1 | 2/2009 | Suzuki et al. | | |
| 2009/0123588 A1 | 5/2009 | Lee et al. | | |
| 2009/0202763 A1 * | 8/2009 | Rose | ....................... | B32B 5/024 428/36.1 |
| 2011/0033622 A1 * | 2/2011 | La Forest | ............... | C04B 35/83 427/249.2 |
| 2011/0298145 A1 * | 12/2011 | Lappe | .................. | B29C 49/6409 264/40.1 |
| 2015/0224684 A1 * | 8/2015 | Mathon | ................... | B29B 11/16 264/138 |

FOREIGN PATENT DOCUMENTS

| | | |
|---|---|---|
| EP | 2 006 074 A1 | 12/2008 |
| NL | 1003167 C2 | 2/1998 |
| WO | WO 99/15323 A1 | 4/1999 |

OTHER PUBLICATIONS

Rujnic-Sokele, Maja, et al., "Process Capability Analysis in the Manufacturing of PET Bottles". Int J Mater Form (2010) vol. 3. Suppl 1:531-534.*
International Search Report dated Feb. 5, 2014 in PCT/FR2013/051942 (with English language translation).
Preliminary Search Report dated May 22, 2013 in French Patent Application No. 1258041 (with English translation of categories of cited documents).
J.A. Holmberg, et al., "Manufacturing and performance of RTM U-beams" Composites, IPC Business Press LTD., vol. 28A No. 6, XP000658862, Jan. 1997, pp. 513-521.

* cited by examiner

*Primary Examiner* — Bret P Chen
(74) *Attorney, Agent, or Firm* — Oblon, McClelland, Maier & Neustadt, L.L.P.

(57) ABSTRACT

A method for forming a preform for a hollow turbomachine component is provided. The method includes positioning a sheet made of woven fibers on a base equipped with a longitudinal impression; positioning a mandrel in the longitudinal impression to clamp the sheet between the base and the mandrel, the mandrel having a thickness that increases between a proximal end and a distal end; locking the distal end of the mandrel into position; placing a proximal block resting on the base; forming two flaps of the sheet around the flanks of the mandrel; resting two lateral blocks on the base on either side of the mandrel; locking the lateral blocks into position to form an assembly; drying the assembly to form a preform including a flat base, from which two flaps extend perpendicularly; and adjusting the flaps to the dimensions of the mandrel by trimming excess material.

5 Claims, 5 Drawing Sheets

METHOD FOR PRODUCING PREFORMS

GENERAL TECHNICAL FIELD

Figure 1:
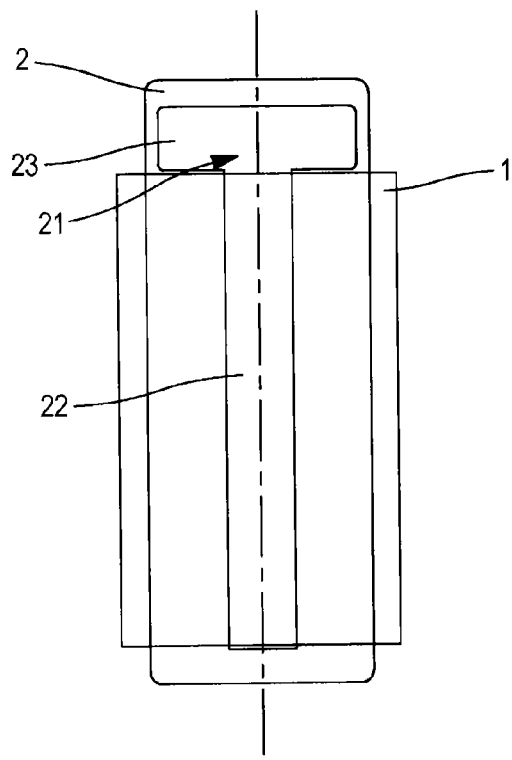

The present invention relates to the field of manufacturing methods for hollow turbomachine component, and more particularly to manufacturing preforms adapted to be assembled and placed in injection tooling for hollow turbomachine components.

STATE OF THE ART

Due to their specific geometry and their tolerances, hollow components used in turbomachines are complex to produce.

Such hollow components are typically produced by means of an injection process conventionally requiring the use of preforms positioned inside the injection mold, production of these preforms affecting the quality of the final part thus obtained.

However, production of such preforms is complex, and requires a plurality of distinct steps, each influencing the final quality of the part.

PRESENTATION OF THE INVENTION

The present invention aims to propose a method for producing preforms for the production of hollow turbomachine components, providing accurate positioning and dimensioning while still being operable at an industrial scale.

To this end, the invention proposes a forming method for a preform for a hollow turbomachine component, wherein
  a sheet made of woven fibers is positioned on a base, said base being provided with a longitudinal impression,
  a mandrel is positioned in said longitudinal impression, so as to clamp said sheet between the base and the mandrel, the mandrel having a thickness that increases between a proximal end and a distal end, and having to longitudinal flanks substantially perpendicular to the base,
  the distal end of the mandrel is locked in position,
  a proximal block is placed resting on the base, so as to cover the proximal end of the mandrel, and said proximal block is locked,
  two flaps of the sheet are formed around the flanks of the mandrel,
  two lateral blocks are positioned resting on the base on either side of the mandrel, so as to clamp each flap between one of said lateral blocks and one flank of the mandrel,
  said lateral blocks are locked in place,
  drying of the assembly thus formed is carried out, so as to fix the shape of the sheet and thus form a preform thus including a flat base from which two flaps extend perpendicularly,
  the flaps are adjusted to the dimensions of the mandrel, by trimming away the excess material.
As a variant, said method has one or more of the following features, taken independently or in combination:
  adjustment of the flaps to the dimensions of the mandrel is accomplished by positioning a tapping block opposite the edges of the mandrel,
  locking into position is accomplished by means of collets or clamping screws, said sheet is made of braided carbon fibers, and said preform is adapted for producing a turbomachine vane preform.

The invention also relates to a method wherein
  two preform forming steps are accomplished by means of the method as defined previously so as to produce a first U-shaped preform and a second TT-shaped preform,
  the two preforms thus produced are associated by inserting the first U-shaped preform between the two flaps of the second TT-shaped preform, such that the bases of said two preforms are opposite and separated by their respective flaps,
  the assembly thus formed is placed in injection tooling.
The invention also relates to tooling for compacting, drying and trimming a preform of a hollow turbomachine component, characterized in that it includes:
  a base, adapted to serve as a support to a sheet of material, including a longitudinal impression,
  a mandrel adapted to be position in said longitudinal impression, so as to clamp a sheet of material against the base, and thus defining two flaps of said sheet located on either side of the mandrel, said mandrel having a thickness that increases between a proximal end and a distal end, and having two longitudinal flanks substantially perpendicular to the base,
  two lateral blocks, adapted to be positioned resting on the base on either side of the mandrel so as to clamp the flaps of the sheet against the mandrel,
  said lateral blocks and/or the mandrel being adapted to cooperate with means for trimming said flaps so as to adjust them to the dimensions of the mandrel or said lateral blocks,
  said tooling also including a proximal block, adapted to be positioned resting against one end of the mandrel, and to accomplish its locking against the base.
As a variant, said tooling has one or more of the following features, taken independently or in combination:
  said lateral blocks and/or the mandrel have recesses adapted to accommodate a tapping block to as to absorb the excess during adjustment of the flaps to the dimensions of the mandrel or of said lateral blocks,
  the base, the mandrel, the lateral blocks, and the proximal block, if any, are made of resin, of thermoplastic material, of aluminum or of steel.

PRESENTATION OF THE FIGURES

Figure 3:
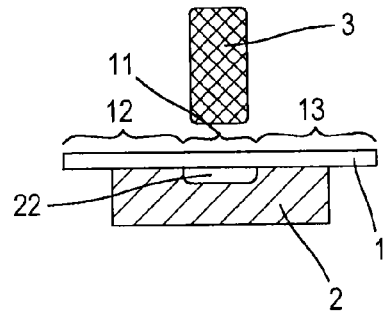
Figure 2:
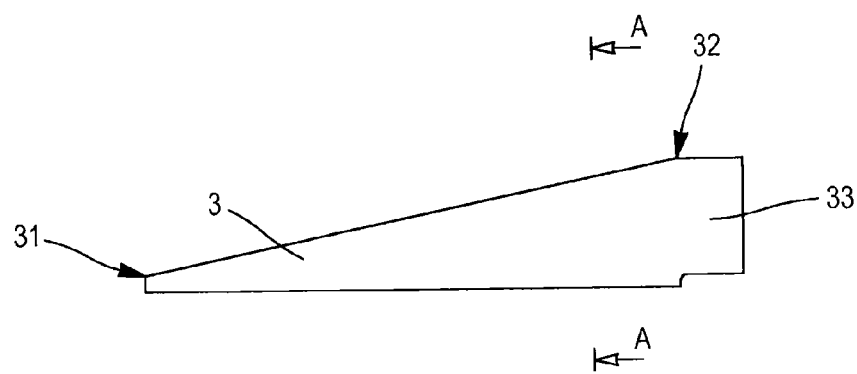
Figure 4:
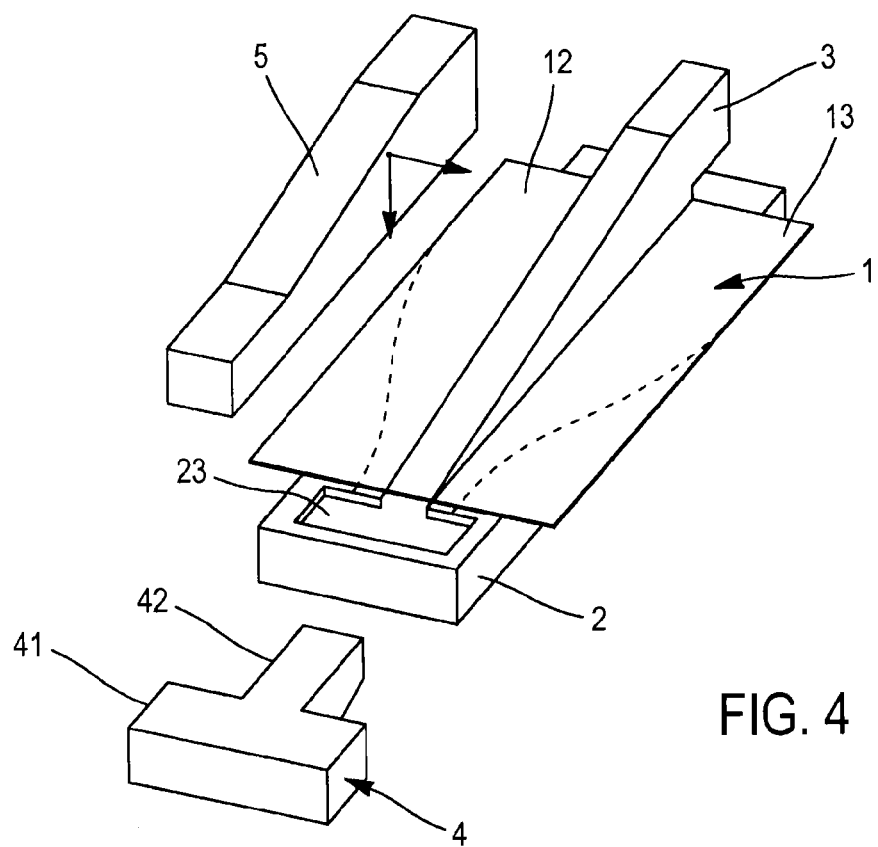
Figure 5:
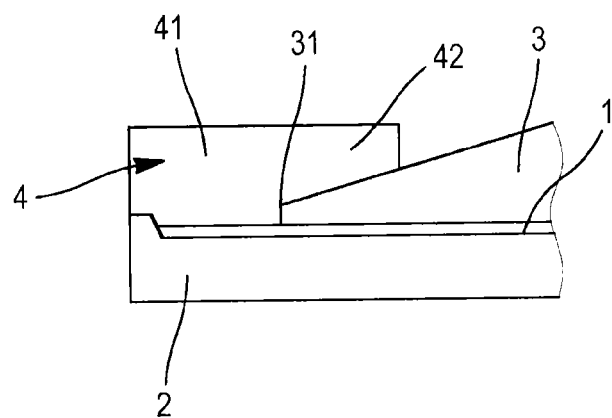
Figure 6:
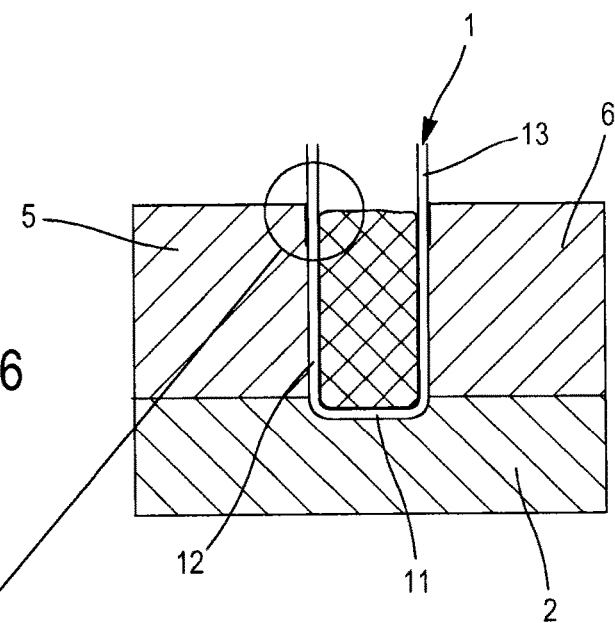
Figure 7:
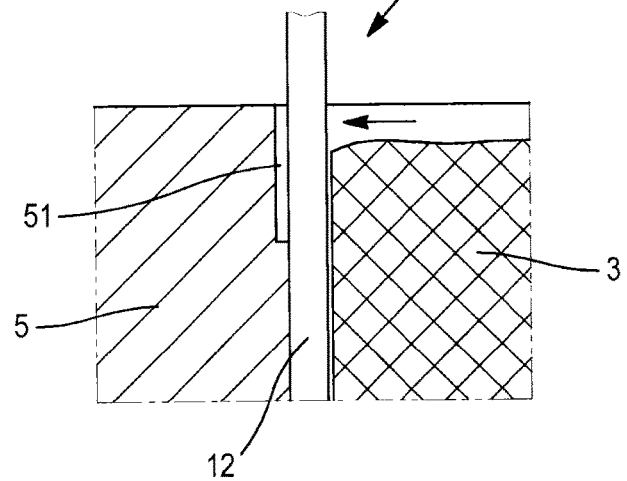
Figure 8:
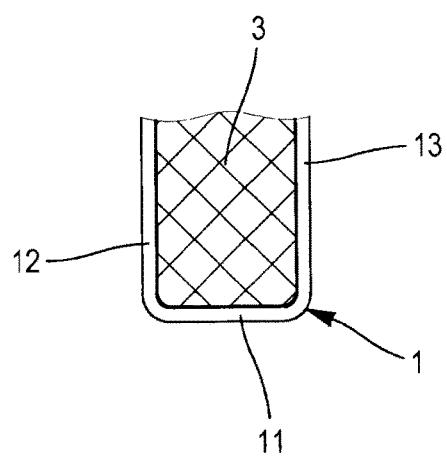
Figure 9:
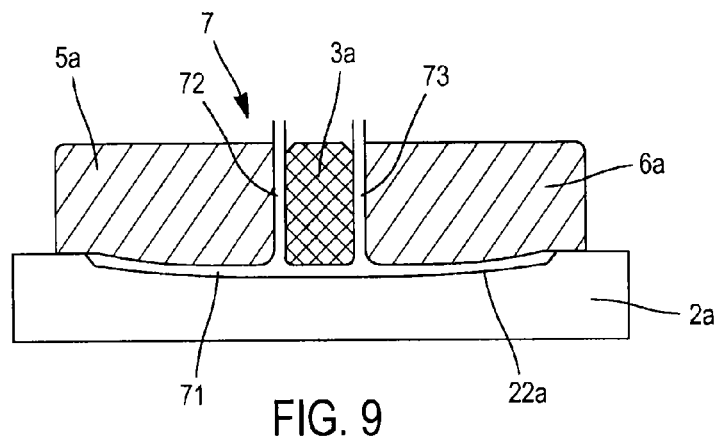
Figure 10:
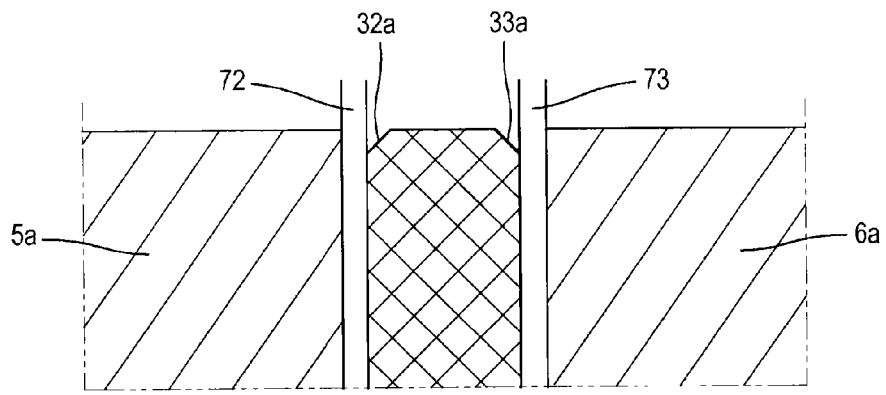
Figure 11:
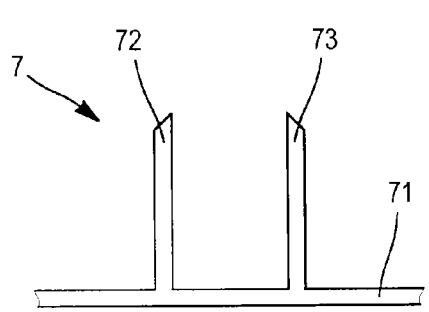
Figure 12:
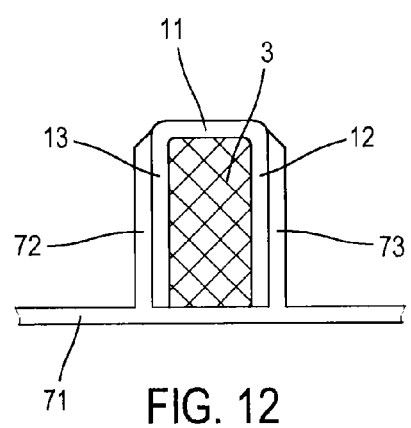
Figure 14:
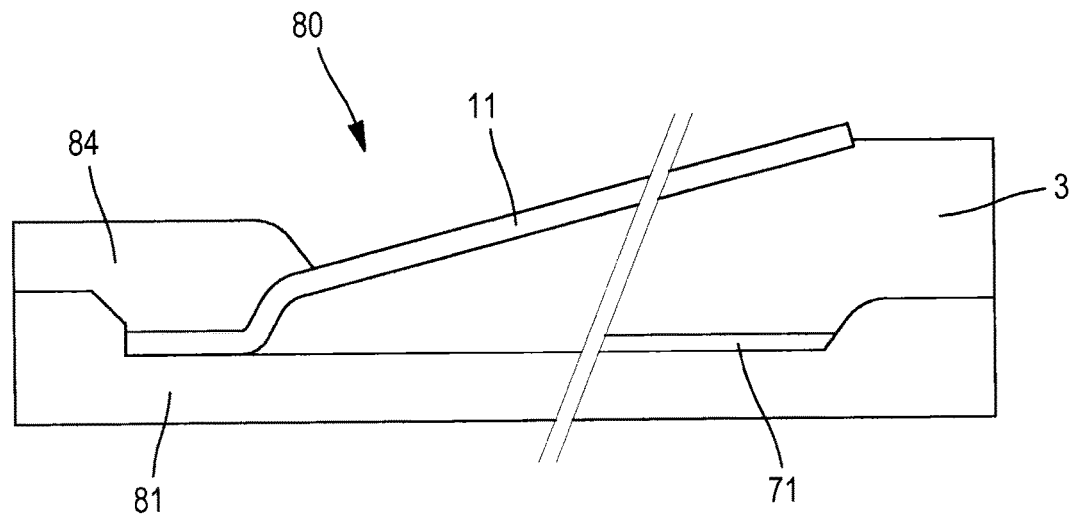
Figure 13:
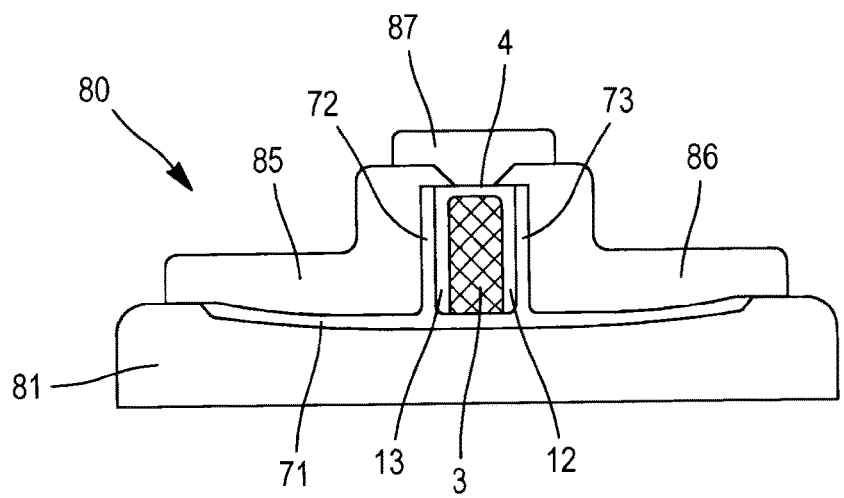

Other features, aims and advantages of the invention will emerge from the description that follows, which is purely illustrative and not limiting, and which must be read with reference to the appended drawings, wherein:

FIG. 1 shows a view of a sheet of material placed on the base of tooling according to one aspect of the invention;

FIG. 2 shows a side view of a mandrel of tooling according to one aspect of the invention, FIG. 3 shows a section view of the association of the base, of the sheet and of the mandrel shown previously, FIG. 4 shows a view of the assembly presented in FIG. 3, to which are added additional elements of the tooling according to one aspect of the invention, FIG. 5 shows a detail view of locking into position of the mandrel, FIG. 6 shows a section view of the assembly thus formed, FIG. 7 shows a detail view of one zone of FIG. 6, FIG. 8 shows an example of a preform obtained by means of the tooling shown previously, FIG. 9 shows another variant of tooling according to one aspect of the invention, FIG. 10 shows a detail view of one zone of the tooling shown in FIG. 9, FIG. 11 shows another variant of a preform obtained by means of this tooling, FIG. 12 shows an assembly of the two preforms presented previously, FIGS. 13 and 14 shows two views of this assembly positioned in an injection mold according to one aspect of the invention.

In all the figures, the common elements are designated with identical numerical references.

DETAILED DESCRIPTION

FIG. 1 shows a sheet 1 of material positioned on a base 2 of forming tooling.

The sheet 1 is typically a sheet made of 3D-woven fibers, typically carbon fibers.

The base 2 includes a T-shaped impression 21, thus having a longitudinal impression 22 and a transverse impression 23. The sheet 1 of material is positioned so as to cover the longitudinal impression 22, or more precisely so that the length of the sheet 1 is positioned between the two ends of the longitudinal impression 22.

FIG. 2 shows a side view of a mandrel 3 adapted to be associated with the base 2 shown previously.

The mandrel 3 has the general shape of a wedge; it has a thickness that increased between a proximal end 31 and a distal end 32, and having two longitudinal flanks substantially perpendicular to the base. Its distal end 32 extends into a typically parallelepiped attachment section 33, adapted to rest against the base 2 and allow the mandrel 3 to be locked into position on the base 2.

The length between the proximal end 31 and the distal end 32 of the mandrel 3 is advantageously equal to the length of the longitudinal impression 22 of the base 2.

FIG. 3 shows a section view in a plane A-A shown in FIG. 2 of the mandrel 3, as well as of the base 2 and of the sheet 1 of material.

The mandrel 3 is positioned so as to insert itself into the longitudinal impression 22 of the base 2, the attachment section 33 of the mandrel resting against the base 2 outside of the longitudinal impression 22, aligned with its end opposite to the end connected with the transverse impression 23.

By thus positioning the mandrel 3 in the longitudinal impression 22 of the base 2, a portion 11 (indicated in FIG. 3) of the sheet 1 of material is formed so as to conform to the longitudinal impression 22 of the base 2, due to the action of the mandrel 3.

Thus two flaps 12 and 13 are defined, located on either side of this portion 11, that is on either side of the mandrel 3.

FIG. 4 shows a view of the assembly consisting of the base 2, the sheet 1 and the mandrel 3, to which is associated a proximal block 4 as well as two lateral blocks 5 and 6 (only one lateral block 5 is shown in this figure).

The proximal block 4 has generally a T shape, and includes a first section 41 adapted to be inserted into the transverse impression 23 of the base 2, and a second section 42 adapted to rest against the mandrel 3 positioned on the base 2.

FIG. 5 illustrates the relative positioning of the sheet 1, the base 2, the mandrel 3 and the proximal block 4, the second section 42 of the proximal block resting against the upper face of the mandrel 3, so that the proximal end 31 of the mandrel 3 is held pressed against the base 2.

FIG. 4 also shows the lateral block 5, which is positioned on the base 2 so as to rest against a lateral face of the mandrel 3.

The corresponding flap 12 is previously folded so as to extend along the lateral face of the mandrel 3, substantially perpendicularly to the base 2.

Thus, the flap 12 is clamped between the mandrel 3 and the lateral block 5.

The second lateral block 6 is positioned similarly, so as to rest against the other lateral face of the mandrel 3 and to clamp the other flap 13 between the mandrel 3 and the second lateral block 6.

FIG. 6 shows a cross-section view of the assembly thus formed. The U shape given to the sheet 1 can be seen, the different portions whereof are clamped between the base 2, the mandrel 3 and the lateral blocks 5 and 6.

FIG. 7 shows a detail view of a portion marked with a circle in FIG. 6. Shown in this figure is the free end of the flap 12, located between the mandrel 3 and the lateral block 5.

So as to avoid considerable constraints in positioning the sheet 1 on the base 2, the sheet 1 is advantageously dimensioned so as to be larger than necessary, which involves the flaps 12 and 13 extending beyond the mandrel 3 once the U shaping is accomplished, as can be seen in FIG. 7.

Once the U shaping is accomplished, the two flaps 12 and 13 are then adjusted to the height of the mandrel 3, by trimming and removing the excess material.

This operation is typically accomplished while the assembly is in the configuration shown in FIG. 6. A blade then cuts the excess material of the flaps 12 and 13, by running along the upper edge of the mandrel 3.

To this end, the lateral edges 5 and 6 advantageously include a recess adapted so as to receive a tapping block, that is a shim made of a soft material, adapted to absorb machining overruns during trimming and thus avoid damaging the lateral edges 5 and 6. FIG. 7 thus shows a tapping block 51 positioned in a recess provided in the lateral edge 5, at the upper edge of the mandrel 3.

Conversely, it is possible to provide recesses in the mandrel 3 so as to place tapping blocks there, and to carry out the trimming operation by following the edge of the lateral blocks 5 and 6.

These means adapted to carry out the adjustment and trimming of the flaps 12 and 13 directly in the tooling, allowing an accurate trim to be obtained, without deforming the preform and without removing fiber.

FIG. 8 shows the sheet 1 formed into a U positioned around the mandrel 3, after removal of the lateral blocks 5 and 6, of the proximal block 4 and of the base 2. The sheet 1 thus formed has typically been dried before removal of these different elements, so as to fix it in this U shape.

FIG. 9 shows an assembly similar to that shown in the foregoing figures, wherein the TT shaping of a sheet 7 or material is accomplished. The various elements are designated with the same numerical references as before, followed by the letter a.

The sheet 7 is typically a sheet made of 3-D woven fibers, for example made of carbon fibers.

The different steps, as well as the means used, are similar to those described with reference to the foregoing figures, with the exception of the impression 22a in the base 2a, which is adapted so as to form a portion 71 larger than the portion 11 formed previously.

Moreover, the sheet 7, as positioned initially in the base 2a, consists of several panes which are positioned on the base 2a. The mandrel 3a is then positioned between two flaps 72 and 73, along the longitudinal axis of the sheet 7. The proximal block (not shown) and the lateral blocks 5a and 6a are then positioned so as to form a large portion 71 resting on the base 2a, from which extend two flaps 72 and 73, substantially perpendicularly to the portion 71, these two flaps 72 and 73 extending to either side of the longitudinal axis of the portion 71 and being clamped between the mandrel 3a and respectively the lateral flap 72 and the lateral flap 73.

FIG. 10 shows a detail view of FIG. 9 highlighting the adjustment of the flaps 72 and 73 to the height of the mandrel 3a.

As in the foregoing, the flaps 72 and 73, as positioned on the base 2a, are initially over-dimensioned, so as to avoid constraints connected with extremely accurate positioning of a sheet which was already dimensioned prior to forming.

As before, the two flaps 72 and 73 of the sheet 7 are adjusted by removing excess material, for example by means of a cutting tool running along the upper edges of the mandrel 3a.

As described previously with reference to FIG. 7, a tapping block can be used for carrying out the trimming operation.

As before, the trimming procedure can easily be reversed, by accomplishing it by running along the edges of the lateral blocks 5a and 6a, the mandrel 3a then advantageously including one or more recesses for accommodating the tapping blocks.

In the embodiment shown in FIG. 10, the mandrel 3a has beveled lateral edges 32a and 33a, which allows them to serve as a guide for a trimming blade for example.

FIG. 11 shows a view of the sheet 7 formed into a TT shape, once the lateral blocks 5a and 6a, the proximal block 4a, the mandrel 3a and the base 2a are removed. The sheet 7 thus shaped has typically been dried prior to removal of these different elements, so as to fix it in this TT shape.

FIGS. 1 to 11 thus show tooling and the different associated steps for producing two half-preforms typically made of 3D-woven fiber, carbon fiber for example.

The tooling described previously for producing these two preforms makes it possible to accomplish the operations of shaping, compacting, drying and trimming, for a given preform, in the same tooling, thus ensuring accurate shaping of these preforms.

FIG. 12 shows the assembly of the preforms thus formed from two previously formed sheets 1 and 7, and illustrated in FIGS. 8 and 11 respectively.

As shown in this figure, the preforms previously produced are assembled, the U-shaped sheet 1 being inserted between the flaps 72 and 73 of the TT-shaped sheet 7, so that their two portions 11 and 71 are opposite and separated by their lateral flaps 12, 13, and 73, and the mandrel 3 used for U-shaping the sheet 1 is also positioned between these two portions 11 and 71.

FIGS. 13 and 14 show section views illustrating positioning of the assembly thus formed in tooling 80, typically injection tooling.

The tooling 80 includes a base 81 adapted to serve as a support for the portion 71 of the sheet that is given a TT shape, a proximal locking block 84, lateral blocks 85 and 86, and an upper block 87.

These different elements are locked into position, so as to clamp the assembly of shaped sheets 1 and 7 and thus form an injection mold, making it possible to form a hollow turbomachine component, for example a vane platform of a turbomachine.

The different tooling elements presented, particularly the bases 2, 2a and 81, the mandrels 3 and 3a, the proximal blocks 4, 4a and 84, the lateral blocks 5, 5a, 6, 6a, 85 and 86, and the upper block 87 are typically made of resin or of thermoplastic material in the case where they are made by rapid prototyping, or of aluminum or of steel.

These different tooling elements are locked into position typically by means of collets or clamping screws, clamping being accomplished in the direction of the sheet 1 or 7 so as to clamp it between different elements of the tooling.

The invention thus makes it possible to produce a complex assembly of several preforms for producing a hollow turbomachine component, said preforms being capable of being placed directly into injection tooling.

The invention finds particular application for producing the vane platform of a turbomachine.

The invention claimed is:

1. A method for forming a preform for a hollow turbomachine component, the method comprising:
   positioning a sheet made of woven fibers on a base, said base being equipped with a longitudinal impression,
   positioning a mandrel in said longitudinal impression so as to clamp the sheet between the base and the mandrel, the mandrel having a thickness that increases between a proximal end and a distal end, and having two longitudinal flanks substantially perpendicular to the base,
   locking the distal end of the mandrel into position,
   placing a proximal block resting on the base, so as to cover the proximal end of the mandrel, and said proximal block is locked,
   forming two flaps of the sheet around the two longitudinal flanks of the mandrel,
   resting two lateral blocks on the base on either side of the mandrel, so as to clamp each flap between said lateral blocks and one flank of the mandrel,
   locking said two lateral blocks into position and thereby forming an assembly of said sheet positioned with the mandrel, the proximal block, and the lateral blocks,
   drying the assembly, so as to fix the shape of the sheet and to form the preform including a flat base, from which the two flaps extend perpendicularly, and
   adjusting the two flaps to the dimensions of the mandrel by trimming excess material.

2. The method according to claim 1, wherein the adjustment of the flaps to the dimensions of the mandrel is accomplished by positioning a tapping block opposite edges of the mandrel.

3. The method according to claim 1, wherein locking into position is accomplished with collets or clamping screws.

4. The method according to claim 1, wherein said sheet is made of braided carbon fibers, and wherein said preform is adapted for producing a turbomachine vane platform.

5. A method for assembling preforms, said method comprising:
   performing two preform forming steps with the method according to claim 1, so as to achieve a first preform having a U shape and a second preform having a TT shape, and
   associating the two preforms thus produced by inserting the first U-shaped preform between the two flaps of the second TT-shaped preform, so that the bases of said two preforms are opposite and separated by their respective flaps, thereby forming an assembly of two preforms.

* * * * *